United States Patent
Ströder et al.

(10) Patent No.: US 6,916,357 B2
(45) Date of Patent: Jul. 12, 2005

(54) METHOD FOR INTRODUCING A GRANULAR ORE INTO A ROASTING KILN

(76) Inventors: Michael Ströder, Dürerstrasse 77, D-61267 Neu-Anspach (DE); Horst Zingrebe, Zeisigweg 13, D-65205 Wiesbaden (DE); Hubert Vollmer, Grüner Weg 2a, D-61462 Königstein (DE)

( * ) Notice: Subject to any disclaimer, the term of this patent is extended or adjusted under 35 U.S.C. 154(b) by 0 days.

(21) Appl. No.: 10/433,693

(22) PCT Filed: Nov. 27, 2001

(86) PCT No.: PCT/EP01/13784
§ 371 (c)(1),
(2), (4) Date: Jun. 5, 2003

(87) PCT Pub. No.: WO02/46673
PCT Pub. Date: Jun. 13, 2002

(65) Prior Publication Data
US 2004/0060392 A1 Apr. 1, 2004

(30) Foreign Application Priority Data
Dec. 6, 2000 (DE) .......................... 100 60 516

(51) Int. Cl.⁷ ................................................ C22B 1/10
(52) U.S. Cl. ............................. 75/754; 75/444; 75/637; 75/654; 266/172

(58) Field of Search .................... 75/754, 444, 637, 75/654; 266/172

(56) References Cited

U.S. PATENT DOCUMENTS

| RE4,898 E | * | 5/1872 | Whelpley et al. ............. 75/707 |
| 3,610,182 A | | 10/1971 | Stockman |
| 4,144,051 A | * | 3/1979 | Rahn et al. .................... 75/754 |
| 4,678,508 A | * | 7/1987 | Saeki et al. ................... 75/450 |

FOREIGN PATENT DOCUMENTS

JP  58002141  1/1983

* cited by examiner

*Primary Examiner*—Melvyn Andrews
(74) *Attorney, Agent, or Firm*—Herbert Dubno

(57) ABSTRACT

Granular ore or ore concentrate is charged into a furnace for calcining the ore at temperatures of 400 to 1050° C., the ore forming a stationary fluidized bed in the furnace. The ore is thrown onto the fluidized bed through an opening in the furnace housing disposed above the fluidized bed, the ore being accelerated by blades of a rotating impeller. The impeller is disposed outside the furnace in the vicinity of the opening of the housing. Preferably, the rotational speed of the impeller is variable, and the impeller is movable and/or pivotable with respect to the furnace.

6 Claims, 2 Drawing Sheets

METHOD FOR INTRODUCING A GRANULAR ORE INTO A ROASTING KILN

CROSS REFERENCE TO RELATED APPLICATIONS

This application is a national stage of PCT/EP01/13784 filed 27 Nov. 2001 and is based upon German national application 100 60 516.8 filed 6 Dec. 2000 under the International Convention.

FIELD OF THE INVENTION

This invention relates to a process for introducing granular ore into a furnace for calcining the ore at temperatures from 400 to 1050° C., the ore forming a stationary fluidized bed in the furnace. The term "ore" is intended to encompass ore concentrates.

BACKGROUND OF THE INVENTION

Calcining the ore is an exothermal process. Usually cooling bundles are disposed in the stationary fluidized bed in order to cool the fluidized bed and maintain it at the desired temperature. The transverse mixing of the solid material is relatively weakly developed in the stationary fluidized bed; it is impeded further by the cooling bundles. This leads to the fluidized bed becoming hotter at the point of introduction of the ore than at points where no ore is supplied. Moreover, much sulfur dioxide is obtained at the point of introduction of the ore due to the reaction of the sulfide sulfur with the atmospheric oxygen, whereas at points where little or no ore is supplied, little sulfur dioxide can be obtained, so that only a small part of the atmospheric oxygen supplied is consumed for calcining. In the furnace space above the stationary fluidized bed, there are mostly temperatures above 900° C., and the gas velocities are below 1 m/sec.

Because of the high viscosity of the gases, mixing of the gas streaks rich in sulfur dioxide and of the gas streaks poor in sulfur dioxide hardly occurs. Therefore, pronounced inhomogeneities with respect to temperature, sulfur dioxide concentration and oxygen concentration occur in the furnace space. In gas streaks which are poor in sulfur dioxide but rich in oxygen, an undesired sulfatizing of the solid material preferentially occurs. This leads to the deterioration of the product. Furthermore, sulfatized dust tends to form deposits on the tubes of following waste heat boilers, which deposits can hardly be removed. The transport of heat from the calcining gas to the boiler tube is impeded thereby, the costs for maintaining the boiler are increased, and its availability is reduced.

OBJECT OF THE INVENTION

It is the object underlying the invention that the ore to be calcined should approximately uniformly be distributed on the stationary fluidized bed from the outside. This introduction should be effected in a rather inexpensive and reliable way. In accordance with the invention, this is achieved in that the o

SUMMARY OF THE INVENTION

In accordance with the invention, this is achieved in that the ore is thrown onto the fluidized bed through an opening in the furnace housing disposed above the fluidized bed, the ore being accelerated by blades of a rotating impeller which is disposed outside the furnace in the vicinity of the opening. The opening in the furnace housing usually is provided in a side wall of the housing. In a furnace with large diameter it is possible to provide a plurality of openings in the furnace housing and to allocate impellers to each of these openings.

By means of the inventive process, a substantially improved homogeneity of the temperatures in the fluidized bed and also in the furnace space above the fluidized bed is achieved. At the same time, there is obtained a more homogeneous distribution of the sulfur dioxide and oxygen concentrations in the furnace space. The undesired sulfatizing of dust is impeded, and the product quality and also the operation of the succeeding waste heat boiler are improved thereby.

Expediently, the rotational speed of the impeller is designed to be variable, in order to be able to vary the length of throw upon introduction. It is furthermore expedient to design the impeller so as to be pivotable or movable with respect to the furnace, whereby the throwing direction for the ore can be varied. The movability of the impeller can also be advantageous during maintenance work. The pivotability of the impeller can for instance be produced in that the impeller is mounted on a vertical, rotatable axle. Instead of the axle there may also be provided a horizontal rail on which the impeller is disposed by means of a movable supporting device.

For calcining purposes, granular ore is charged into the furnace, e.g. zinc blende, gold ore or pyrite or concentrates of these ores. The ores may e.g. be granulated prior to calcining.

BRIEF DESCRIPTION OF THE DRAWING

Embodiments of the process will be explained with reference to the drawing, in which.

SPECIFIC DESCRIPTION

Figure 1:
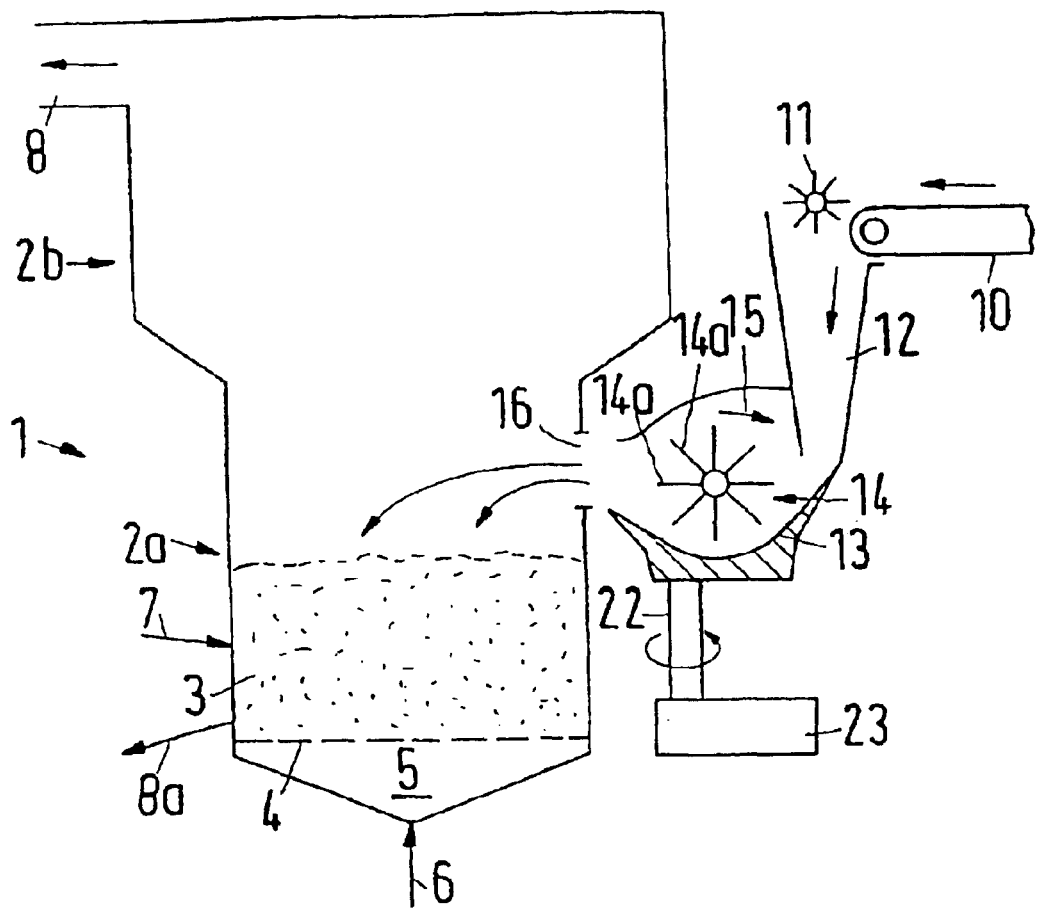
FIG. 1 is a vertical section through a calcining furnace with associated impeller.

The calcining furnace 1 has a housing with a lower, approximately cylindrical housing part 2a and an upper, expanded housing part 2b. The ore to be calcined forms a stationary fluidized bed 3 on a grid 4 through which passes fluidizing air, which comes from the distribution chamber 5, in an upward direction. The air, which preferably is preheated, is supplied via line 6. If necessary, additional fuel which may be solid, liquid or gaseous, is introduced into the fluidized bed 3 through line 7 or also through a plurality of lines. Exhaust gas is discharged via the passage 8 and supplied to a deducting, cooling and cleaning stage (not shown). Part of the calcined product is obtained via the passage 8, another part is obtained via the is discharge line 8a.

The ore to be calcined, which may be moist, is supplied via a conveyor belt 10, and a toothed roll 11 serves to comminute lumps. The ore then drops through a duct 12 into a trough 13 and is seized by a rotating impeller 14. The direction of rotation of the impeller 14 is indicated by the arrow 15. The blades 14a of the impeller seize the granular ore and throw it through the opening 16 in the lower housing part 2a onto the fluidized bed 3.

Figure 2:
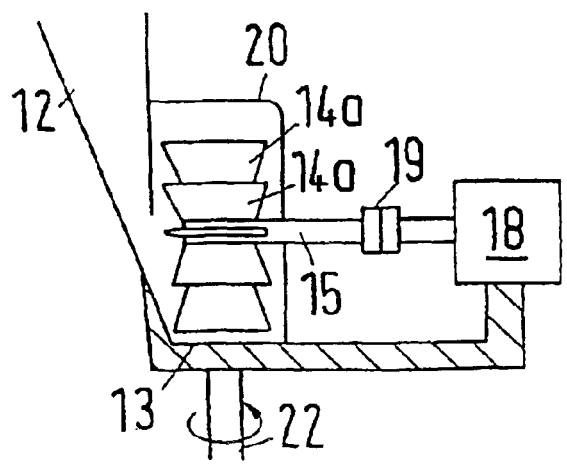
FIG. 2 shows an embodiment of the impeller as seen against the throwing direction.

FIG. 2 shows a view of the blades 14a of the impeller, the, horizontal shaft 15 belonging to the impeller, on which shaft the blades are mounted, and of the motor 18 for driving the shaft 15, with a coupling 19 disposed therebetween. As shown in FIG. 2, the trough 13 constitutes a supporting device also for the motor 18. The impeller is partly surrounded by a housing 20.

The impeller 14 and the trough 13, the motor 18, the duct 12, the shaft 15 and the coupling 19 are designed so as to be movable together, so that the throwing direction of the impeller 14 is variable. This can be effected by means of a vertical support 22 for these parts, and from a stationary drive 23, this support can be swivelled about its vertical longitudinal axis. Another possibility for variation consists in that the rotational speed of the impeller can be varied, whereby the length of throw of the ore thrown through the opening 16 onto the fluidized bed 3 can be varied. In this way, the introduction of the ore onto the fluidized bed can be effected variably and virtually the entire surface of the fluidized bed can be covered with ore to be calcined.

Between the housing opening 16 and the outlet of the impeller 14, which lies between the trough 13 and the upper housing part 20, e.g. a tubular, flexible bellows may be arranged, in order to prevent the exit of dust. For a better clarity, this bellows was omitted in the drawing.

Figure 3:
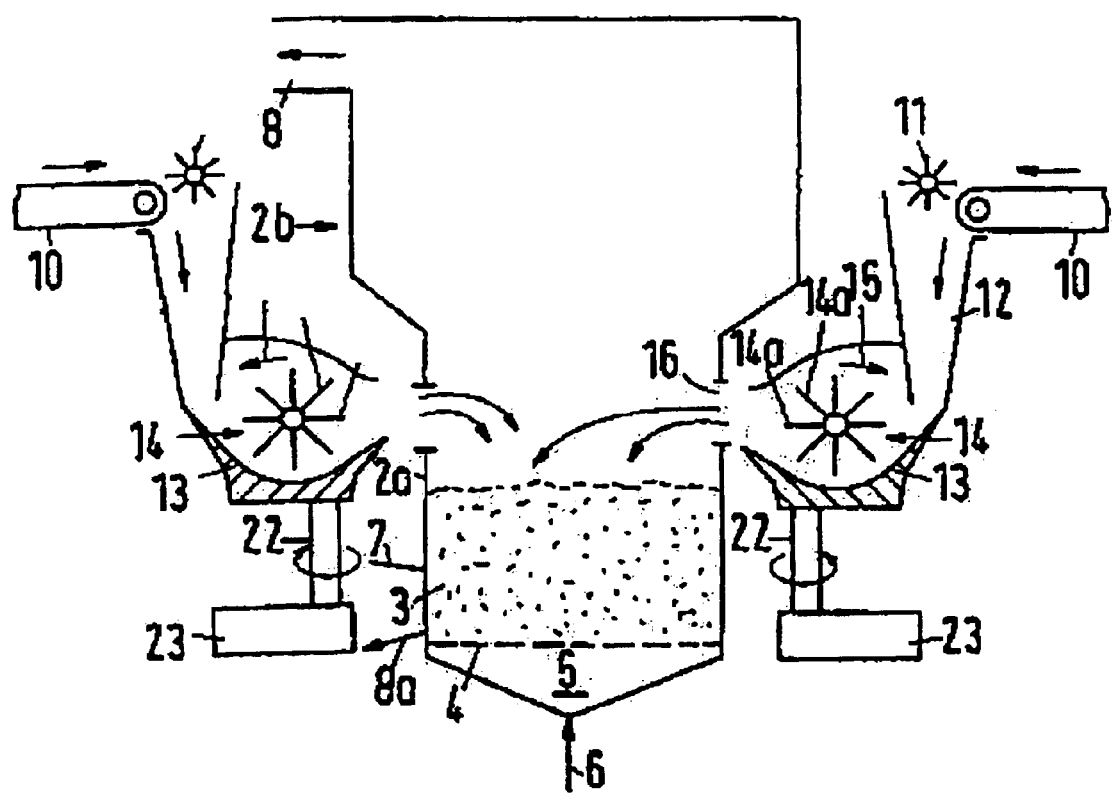
FIG. 3 is a view similar to FIG. 1 of the embodiment.

FIG. 3 is a view similar to FIG. 1 but showing two impellers with associated openings.

SPECIFIC EXAMPLE

In a plant corresponding to the drawing, the procedure is as follows:

A large calcining furnace for zinc blende concentrate (grain sizes: 98 wt-% smaller than 50 $\mu$m) has an inside diameter of 12.5 m. It includes a stationary fluidized bed in which the zinc blends concentrate is calcined at about 950° C. Because of the refractory lining, the furnace wall has a thickness of 450 mm. 40 t/h concentrate with a mean humidity of 8 wt-% are continuously charged into the calcining furnace.

An impeller 14 with a hub diameter of 400 mm with 6 blades 14a having a width of 250 mm and a height of 80 mm delivers this mass flow into the furnace. The distance of the swivel axis 22 from the center of the furnace is 7.2 m. The rotating impeller delivers the ore concentrate into the furnace, scattering both laterally and in throwing direction. In the furnace, an ore heap is formed, whose highest point will furthermore be used to describe the throwing behavior and is referred to as the throwing point. The distance of the throwing point from the swivel axis is referred to as the length of throw.

The rotational speed of the drive 18 is varied such that the smallest length of throw is 3.2 m and the largest length of throw is 11.2 m. The horizontal opening angle of the scatter range is about 25°, with a length of throw of 7.2 m, the ore heap has a width of about 3.2 m. If the impeller is swivelled from its central position by ±28° and the length of throw is adjusted to be about 8.2 m, the lateral areas of the furnace will also be reached. Rotational speed and swivel movement are now varied at the same time, so that the throwing point in the furnace approximately describes a circular path around the center of the furnace, the diameter of the circular path being 8.0 m. The time for a revolution on the circular path is 10 min. Thereby, a rather uniform distribution of the ore concentrate over the furnace cross-section is achieved.

What is claimed is:

1. A method of operating an ore-calcining furnace, comprising the steps of:
    introducing granular ore into a furnace for calcining the ore at temperatures of 400 to 1050° C.;
    maintaining a stationary fluidized bed of the ore in the furnace;
    throwing said ore onto the fluidized bed through an opening in a housing of the furnace housing disposed above the fluidized bed; and
    accelerating the ore by blades of a rotating impeller which is disposed outside the furnace directly in the vicinity of the opening.

2. The method defined in claim 1 wherein the rotational speed of the impeller is variable.

3. The method defined in claim 1 wherein the impeller is movable and/or pivotable with respect to the furnace.

4. The method defined in claim 3 wherein the impeller is disposed on a movable supporting device.

5. The method defined in claim 1 wherein zinc blende, gold ore or pyrite or concentrates of these ores are charged into the furnace.

6. The method defined in claim 1 wherein the ore is introduced into the furnace by at least two impellers with associated openings.

* * * * *